(12) United States Patent
Kwant et al.

(10) Patent No.: US 10,452,956 B2
(45) Date of Patent: Oct. 22, 2019

(54) METHOD, APPARATUS, AND SYSTEM FOR PROVIDING QUALITY ASSURANCE FOR TRAINING A FEATURE PREDICTION MODEL

(71) Applicant: HERE GLOBAL B.V., Eindhoven (NL)

(72) Inventors: Richard Kwant, Oakland, CA (US); Anish Mittal, Berkeley, CA (US); Nicholas Pojman, San Francisco, CA (US); Yangyang Chen, Oakland, CA (US)

(73) Assignee: HERE Global B.V., Eindhoven (NL)

( * ) Notice: Subject to any disclaimer, the term of this patent is extended or adjusted under 35 U.S.C. 154(b) by 32 days.

(21) Appl. No.: 15/720,974

(22) Filed: Sep. 29, 2017

(65) Prior Publication Data

US 2019/0102656 A1    Apr. 4, 2019

(51) Int. Cl.
*G06K 9/00*    (2006.01)
*G06K 9/62*    (2006.01)
(Continued)

(52) U.S. Cl.
CPC ....... *G06K 9/6259* (2013.01); *G01C 21/3602* (2013.01); *G01C 21/3626* (2013.01);
(Continued)

(58) Field of Classification Search
CPC ........... G06K 9/00798; G06K 9/00791; G06K 9/00825; G06K 9/00818;
(Continued)

(56) References Cited

U.S. PATENT DOCUMENTS 8,923,608 B2    12/2014    Devin et al.
9,256,807 B1    2/2016    Shlens et al.
(Continued)

OTHER PUBLICATIONS

Brodley et al., "Identifying Mislabeled Training Data", Journal of Artificial Intelligence Research, vol. 11, No. 1, Aug. 1999, pp. 131-167.

(Continued)

*Primary Examiner* — Vu Le
*Assistant Examiner* — Guillermo M Rivera-Martinez
(74) *Attorney, Agent, or Firm* — Ditthavong & Steiner, P.C.

(57) ABSTRACT

An approach is provided for providing quality assurance for training a feature prediction model. The approach involves training the feature prediction model to label one or more features by using a training data set comprising a plurality of data items with manually marked feature labels. The approach also involves processing the training data set using the trained feature prediction model to generate automatically marked feature labels for the plurality of data items. The approach further involves computing precision data indicating a respective precision between the manually marked feature labels and the automatically marked feature labels for each of the plurality of data items in the training data set. The approach further involves initiating a quality assurance procedure on said each of the plurality of data items based on a determination that the precision data does not satisfy a quality assurance criterion.

20 Claims, 14 Drawing Sheets

(51) Int. Cl.
G06N 3/08 (2006.01)
G06N 3/04 (2006.01)
G01C 21/36 (2006.01)
G05D 1/02 (2006.01)
(52) U.S. Cl.
CPC ....... G05D 1/0246 (2013.01); G06K 9/00798 (2013.01); G06K 9/00805 (2013.01); G06K 9/623 (2013.01); G06K 9/6254 (2013.01); G06N 3/04 (2013.01); G06N 3/08 (2013.01); G05D 2201/0213 (2013.01)
(58) Field of Classification Search
CPC . G06T 2207/20081; G06T 2207/30256; G06T 7/00; G06T 2207/30204
See application file for complete search history.

(56) References Cited

U.S. PATENT DOCUMENTS

| | | | | |
|---|---|---|---|---|
| 2012/0036140 | A1* | 2/2012 | Nielsen | G06F 17/30241 707/754 |
| 2014/0307958 | A1 | 10/2014 | Wang et al. | |
| 2015/0339811 | A1* | 11/2015 | Zhong | G06T 7/0002 382/104 |
| 2016/0342861 | A1 | 11/2016 | Tuzel et al. | |
| 2017/0243083 | A1* | 8/2017 | Wang | G06K 9/00711 |
| 2017/0309092 | A1* | 10/2017 | Rosenbaum | G07C 5/008 |
| 2018/0012082 | A1* | 1/2018 | Satazoda | G06K 9/00805 |
| 2018/0017396 | A1* | 1/2018 | Lynch | G01C 21/32 |
| 2018/0121483 | A1* | 5/2018 | Giurgiu | G06F 17/30241 |
| 2018/0189578 | A1* | 7/2018 | Yang | G01C 21/3635 |
| 2018/0233028 | A1* | 8/2018 | Rhoads | G06F 17/30241 |
| 2018/0365740 | A1* | 12/2018 | Nix | G07C 5/085 |

OTHER PUBLICATIONS

Foody, "The Effect of Mis-labeled Training Data on the Accuracy of Supervised Image Classification by Svm", IEEE International Geoscience and Remote Sensing Symposium (IGARSS), 2015, pp. 4987-4990.
Kavzoglu, "Increasing the Accuracy of Neural Network Classification Using Refined Training Data", Journal of Environmental Modelling & Software, vol. 24, No. 7, Jul. 2009, pp. 850-858.

* cited by examiner

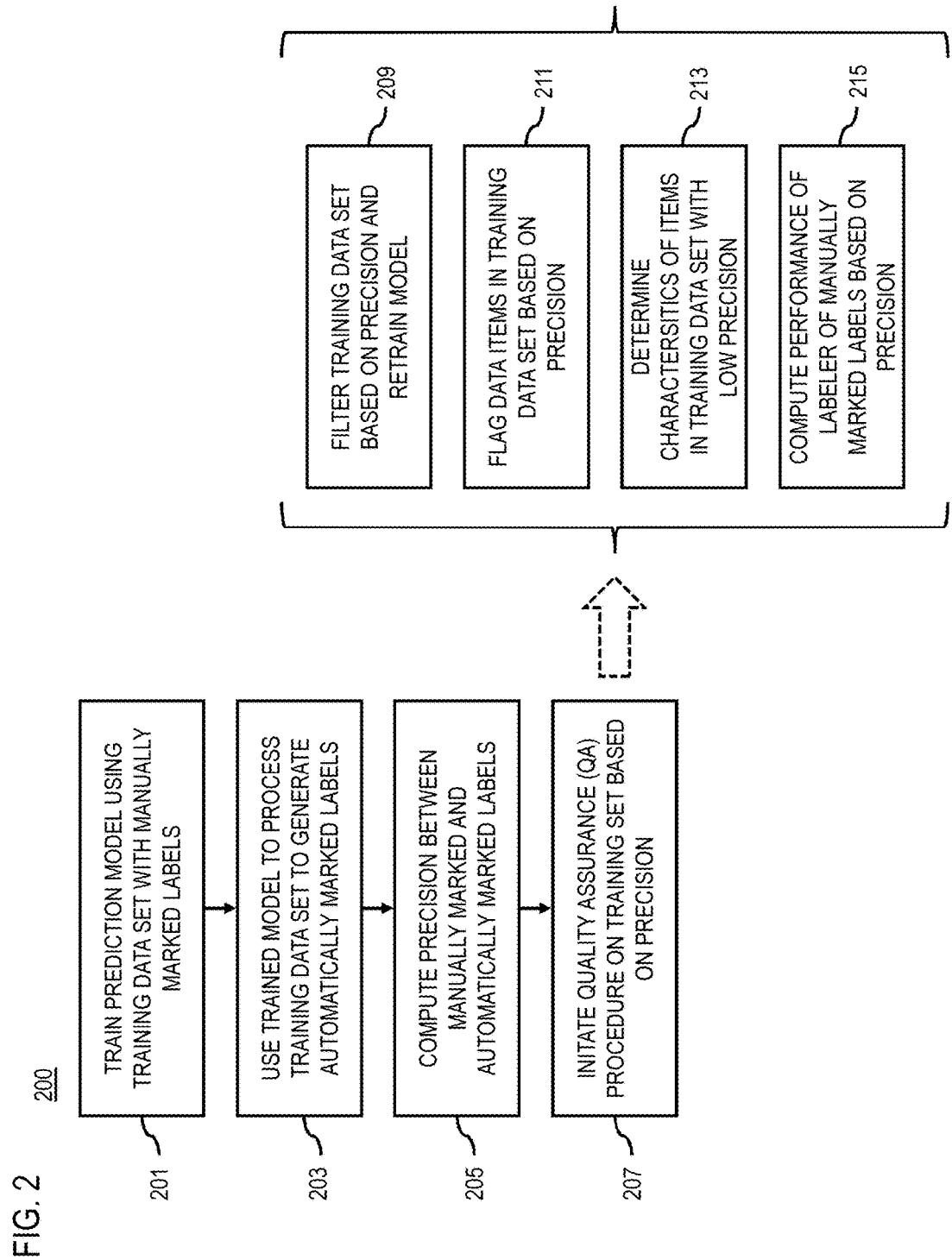

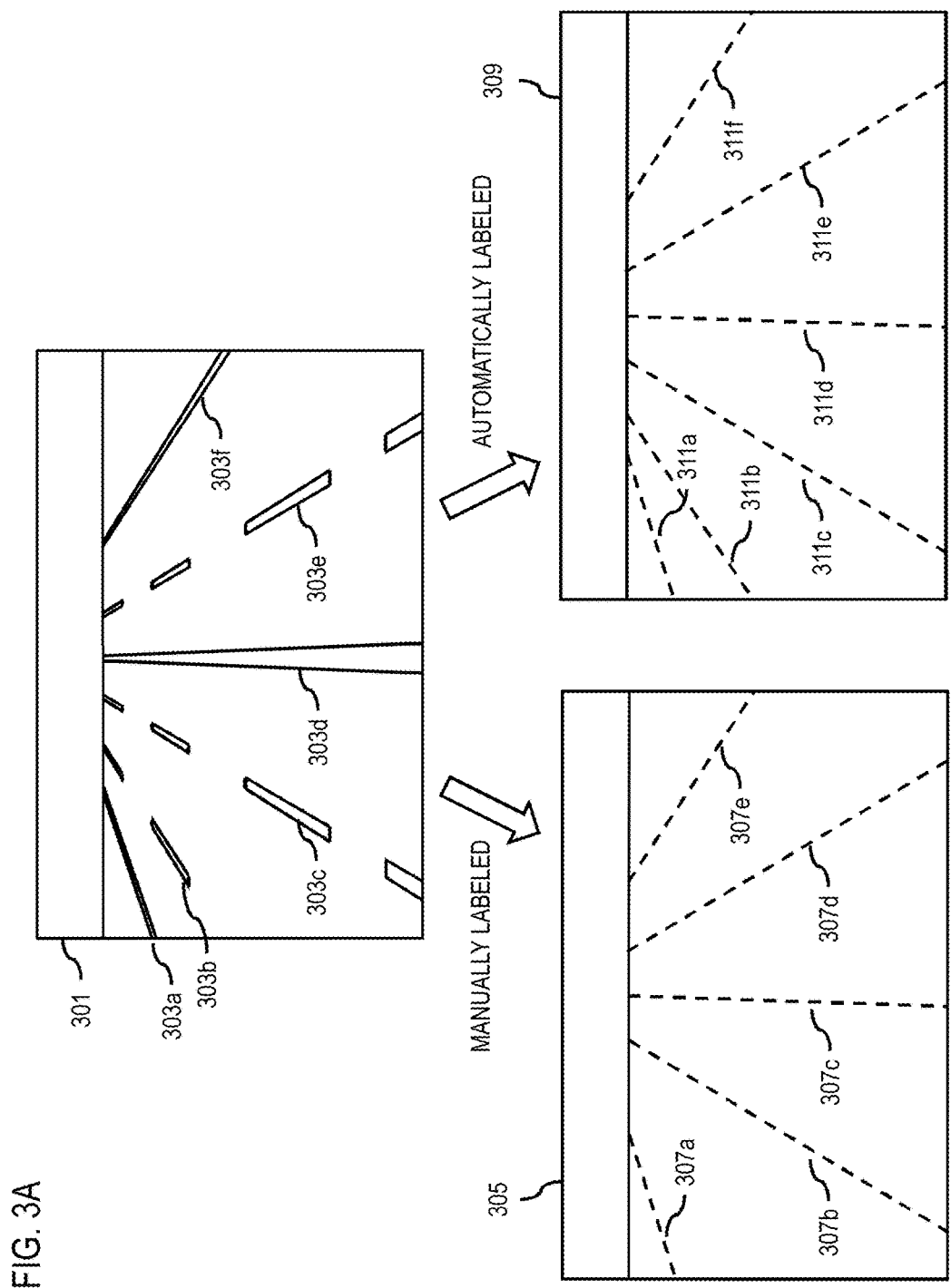

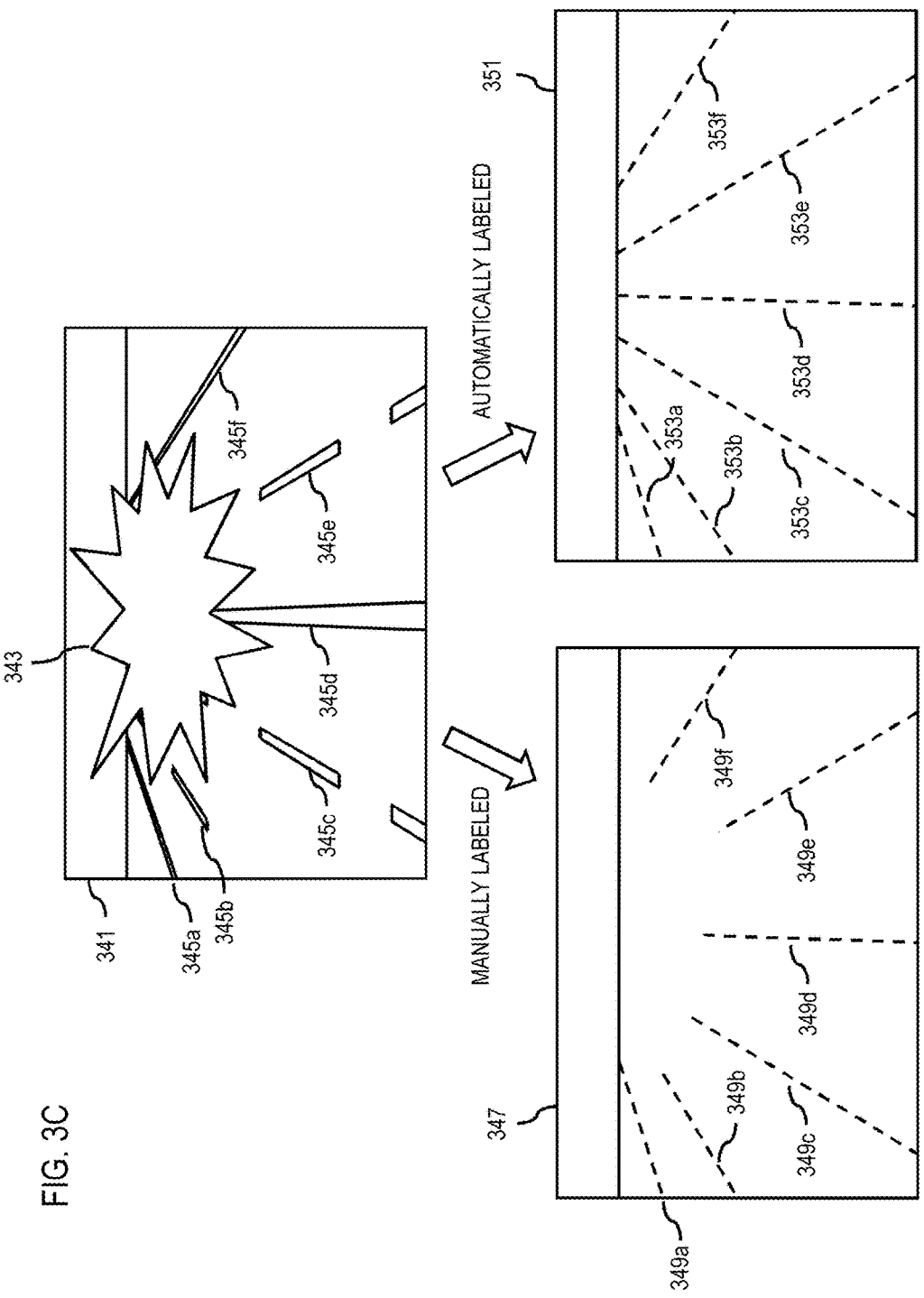

METHOD, APPARATUS, AND SYSTEM FOR PROVIDING QUALITY ASSURANCE FOR TRAINING A FEATURE PREDICTION MODEL

BACKGROUND

Autonomous driving has quickly become an area of interest for vehicle manufacturers and navigation and mapping service providers. One area of interest is the use of computer vision to enable mapping and sensing of a vehicle's environment to support autonomous or semi-autonomous operation. Advances in available computing power have enabled this mapping and sensing to approach or achieve real-time operation through the machine learning feature prediction models. For example, one application of feature prediction models for autonomous driving is localization of the vehicle with respect to known reference marks such as lane markings and/or other visible environmental features labeled by the feature prediction models. However, service providers and manufacturers face significant technical challenges to obtaining training data to create feature prediction models that are able to meet the quality requirements of use cases such as autonomous driving.

SOME EXAMPLE EMBODIMENTS

Therefore, there is a need for an approach for ensuring the use of quality training data for training a feature prediction model.

According to one embodiment, a computer-implemented method for providing quality assurance for training a prediction model to label one or more features comprises training, by a processor, the feature prediction model to label the one or more features (e.g., features detected in an image to support autonomous driving) by using a training data set comprising a plurality of data items (e.g., a plurality of images) with manually marked feature labels. The method also comprises processing the training data set using the trained feature prediction model to generate automatically marked feature labels for the plurality of data items of the training data set. The method further comprises computing precision data indicating a respective precision between the manually marked feature labels and the automatically marked feature labels for one or more of the plurality of images in the training data set. The method further comprises initiating a quality assurance procedure on the one or more of the plurality of data items of the training data set based on a determination that the precision data does not satisfy a quality assurance criterion.

According to another embodiment, an apparatus for providing quality assurance for training a prediction model to label one or more features comprises at least one processor, and at least one memory including computer program code for one or more computer programs, the at least one memory and the computer program code configured to, with the at least one processor, cause, at least in part, the apparatus to train, by a processor, the feature prediction model to label the one or more features (e.g., features detected in an image to support autonomous driving) by using a training data set comprising a plurality of data items (e.g., a plurality of images) with manually marked feature labels. The apparatus is also caused to process the training data set using the trained feature prediction model to generate automatically marked feature labels for the plurality of data items of the training data set. The apparatus is further caused to compute precision data indicating a respective precision between the manually marked feature labels and the automatically marked feature labels for each of the plurality of images in the training data set. The apparatus is further caused to initiate a quality assurance procedure on said each of the plurality of data items of the training data set based on a determination that the precision data does not satisfy a quality assurance criterion.

According to another embodiment, a non-transitory computer-readable storage medium for providing quality assurance for training a prediction model to label one or more features carries one or more sequences of one or more instructions which, when executed by one or more processors, cause, at least in part, an apparatus to train, by a processor, the feature prediction model to label the one or more features (e.g., features detected in an image to support autonomous driving) by using a training data set comprising a plurality of data items (e.g., a plurality of images) with manually marked feature labels. The apparatus is also caused to process the training data set using the trained feature prediction model to generate automatically marked feature labels for the plurality of data items of the training data set. The apparatus is further caused to compute precision data indicating a respective precision between the manually marked feature labels and the automatically marked feature labels for each of the plurality of images in the training data set. The apparatus is further caused to initiate a quality assurance procedure on said each of the plurality of data items of the training data set based on a determination that the precision data does not satisfy a quality assurance criterion.

According to another embodiment, an apparatus for providing quality assurance for training a prediction model to label one or more features comprises means for training, by a processor, the feature prediction model to label the one or more features (e.g., features detected in an image to support autonomous driving) by using a training data set comprising a plurality of data items (e.g., a plurality of images) with manually marked feature labels. The apparatus also comprises means for processing the training data set using the trained feature prediction model to generate automatically marked feature labels for the plurality of data items of the training data set. The apparatus further comprises means for computing precision data indicating a respective precision between the manually marked feature labels and the automatically marked feature labels for each of the plurality of images in the training data set. The apparatus further comprises means for initiating a quality assurance procedure on said each of the plurality of data items of the training data set based on a determination that the precision data does not satisfy a quality assurance criterion.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a flowchart of a process for training a feature prediction model, according to one embodiment;

FIGS. 3A-3C are examples comparing manually marked feature labels with automatically marked feature labels, according to one embodiment;

DESCRIPTION OF SOME EMBODIMENTS

Examples of a method, apparatus, and computer program for training a feature prediction model are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
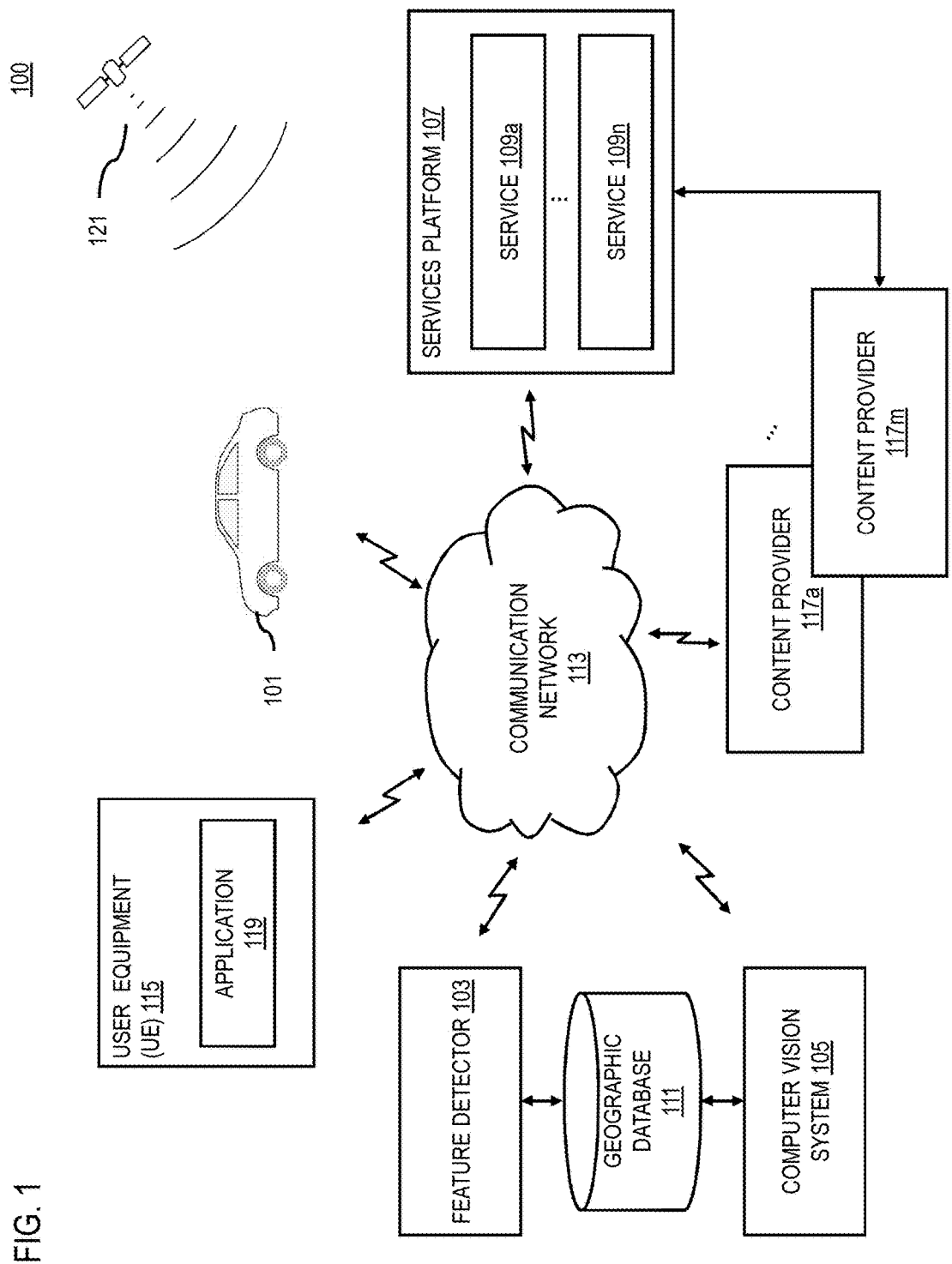
FIG. 1 is a diagram of a system capable of training a feature prediction model, according to one embodiment.

FIG. 1 is a diagram of a system capable of estimating a quality of lane features of a roadway, according to one embodiment. Machine learning using, e.g., feature prediction models enables a range of new services and functions including for applications such as autonomous driving. For example, as discussed above, recent advances in machine learning (e.g., feature prediction models), computer vision and computing power have enabled real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system 105.

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

With respect to lane localization and also generally with respect to autonomous driving, high accuracy and real-time localization of vehicles 101 are needed. Traditionally, most vehicle navigation system has been accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery using feature prediction models (i.e., a machine learning classifier). These features can then be matched to a database of features to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., lane features such as lane markings, lane lines, etc.) can provide better and more accurate localization.

In response to these issues, the system 100 of FIG. 1 (e.g., including the feature detector 103 and/or computer vision system 105) focuses on detecting high level features that have semantic meaning for human beings. One such feature that is important to autonomous driving is the detection of lane features (e.g., lane markings, lane lines, Botts' dots, reflectors, etc.) and corresponding lane models. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101.

In other words, the success of localization based on features detected from an image can depends on the precise localization of those features within the image and the quality of the technique used to detect the lane features or other similar features. This success, for instance, can depend greatly on how well trained a feature prediction model is. Most methods for developing feature detection systems are dependent on manually-generated training data libraries. These libraries consist of thousands of examples of a given feature. Each example generally relies on a human user (e.g., a labeler) to identify, label, and/or categorize features of interest. In addition, to provide a well-trained feature prediction model or classifier, the corresponding training data libraries often must contain a high volume of accurate feature examples. These requirements for both high volume and high accuracy creates significant technical challenges when creating training data libraries.

Human users or labelers who are asked to generate complex feature examples at high speed for extended periods of time will inevitably make errors which can corrupt portions of the training data library. Corrupted or inaccurate feature examples negatively impact on the precision and recall of a feature detection system. Manual quality assurance (QA) is a common method for reducing error rates in training data libraries. However, manual QA still relies on human-input, and the volume demands for feature detection systems require any QA processes to maintain a high throughput, which can be resource intensive and expensive.

Moreover, creation and QA of training data also relies on teams of humans working in collaboration with each other. Human users have differences in their understanding of tasks, as well as differences in their ability to perform the task (e.g., vision impairment, color blindness, lack of experience with tooling, etc.). These differences across users also create inconsistencies and corruption within training data libraries.

To address these challenges, the system 100 of FIG. 1 introduces a capability to perform an automated QA process on the training data that is used to train a feature prediction model. In one embodiment, the system 100 trains a feature detector 103 using a training data set with manually marked feature labels. For example, when the feature detector 103 is used in combination with a computer vision system 105 to detect features or objects depicted in input images (e.g., to support visual odometry for autonomous or semi-autonomous navigation), the training data set can be a set of images that have been manually labeled with features of interest (e.g., lane markings, road signs, buildings, and/or used for visual odometry). It is noted, however, that detecting objects or features in images is provided only as an example of one type of features that can be labeled by the feature detector 103. Accordingly, it is contemplated the embodiments described herein for training a feature prediction model based on automated QA processes are applicable to any type of feature or machine learning classifier.

In one embodiment, the system 100 uses the manually trained feature detector 103 on the manually labeled training data set (e.g., the training images) to generate automatically marked labels for the data items or images in the training data set. The system 100 then compares the automatically marked labels to the manually marked labels to identify any differences between the two sets of labels. In one embodiment, discrepancies between the manually marked labels and the automatically marked labels can indicate potential QA issues. For example, the system 100 can identify images or other data items in the training set whose manually marked labels and automatically marked labels differ by a predetermined threshold or criterion as having potential QA issues.

In one embodiment, the system 100 can use any quality metric to determine the differences between the manually marked labels and the automatically marked labels. For example, when the labeled features are objects or features that can be represented as polygons, examples of such a quality metric can include, but is not limited to, a distance metric that measures the distance (e.g., in pixels or some other unit of measure) between the manually labeled polygons and the corresponding automatically labeled polygons.

Based on the computed difference or precision between the two data sets, the system 100 can perform any type of number of QA processes such as, but not limited to: (1) automatically filtering data items (e.g., images) from the training set that do not meet predetermined precision criteria, and then retraining the feature detector 103 with the training data set remaining after filtering; (2) automatically identifying data items or images that need to be further QA'ed or reviewed; (3) automatically evaluating the performance of labelers (e.g., human labelers) that generated the manually marked labels; (4) automatically identifying characteristics of the data items or images that are most associated with low precision between manually marked and automatically marked labels; etc.

Figure 8:
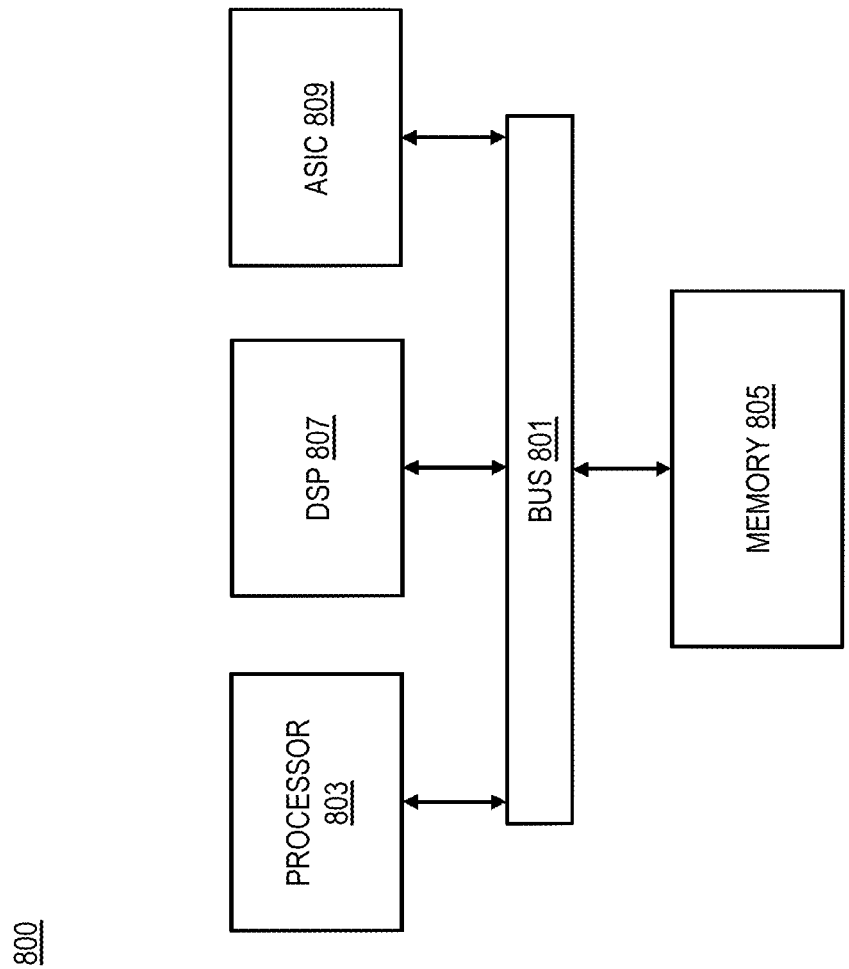
FIG. 8 is a diagram of a chip set that can be used to implement an embodiment of the invention.

FIG. 2 is a flowchart of a process for training a feature prediction model, according to one embodiment. In one embodiment, the feature detector 103 and/or the computer vision system 105 may perform one or more portions of the process 200 and may be implemented in, for instance, a chip set including a processor and a memory as shown in FIG. 8. As such, the feature detector 103 and/or the computer vision system 105 can provide means for accomplishing various parts of the process 200. In addition or alternatively, a services platform 107 and/or one or more services 109a-109n (also collectively referred to as services 109) may perform any combination of the steps of the process 200 in combination with the feature detector 103 and/or the computer vision system 105, or as standalone components. Although the process 200 is illustrated and described as a sequence of steps, it is contemplated that various embodiments of the process 200 may be performed in any order or combination and need not include all of the illustrated steps.

In one embodiment, the feature detector 103 includes or is otherwise associated with a feature prediction model to can be used to label data items (e.g., images) with one or more features (e.g., road markings, signs, and/or other objects that are visible in an image and can be used for visual odometry). Generally, a feature prediction model or machine learning classifier (e.g., a set of equations, rules, decision trees, etc.) manipulates an input feature set to make a prediction about the feature set or the phenomenon that the feature set represents. The feature detector 103 can use any means known in the art to detect features in input data items. As used herein, data items can include any data file or data object representing an observed phenomenon from which features can be extracted, and the features can include any property or characteristic of the data item or observed phenomenon. It is contemplated that the feature prediction model and/or the feature detector 103 can be based on any machine learning classifier or system known in the art or equivalent. For example, with respect to using the feature detector 103 for visual odometry, one technique that has shown significant ability to detect lanes is the use of convolutional neural networks, recurrent neural networks, and/or other equivalent machine learning classifiers to process images. Neural networks have shown unprecedented ability to recognize objects in images, understand the semantic meaning of images, and segment images according to these semantic categories to predict related features. When such neural networks or other machine learning classifiers predict whether an image depicts or is otherwise associated with certain classification features, they can also compute a confidence or probability that the predicted feature is likely to be true. In an embodiment where the features or road or map related feature, the feature detector 103 can use the trained feature prediction model to generate navigation guidance information.

In one embodiment, as discussed above, the feature prediction model uses training or ground truth data to automatically "learn" or detect relationships between different input feature sets and then output a predicted feature. The quality of the feature prediction model and the feature predictions that it makes can be highly dependent on the quality of the training data set used to train the model. Training data is generally created by human labelers who manually mark labels for each data item in the training data set. For example, with respect to a use case of machine learning based object detection in images, the training or ground data truth data can include a set of images that have been manually marked with feature labels to indicate examples of the features or objects of interest. A manually marked features that are objects (e.g., lane markings, road signs, etc.), for instance, can be a polygon or polyline representation of the feature that a human labeler has visually detected in the image. In one embodiment, the polygon, polyline, and/or other feature indicator can outline or indicate the pixels or areas of the image that the labeler designates as depicting the labeled feature. As discussed above, the training data set can potentially require thousands of examples (e.g., individual data item or images) marked with each feature of interest to train the feature prediction model to a specified quality.

Accordingly, in step 201, the feature detector 103 trains the feature prediction model to label one or more features by using a training data set comprising a plurality of data items (e.g., images) with manually marked feature labels. In one embodiment, the feature detector 103 can incorporate a supervised learning model (e.g., a logistic regression model, RandomForest model, and/or any equivalent model) to provide feature matching probabilities that are learned from the training or ground truth data. For example, during training, the feature detector 103 uses a learner module that feeds feature sets from the training data set into the feature prediction model to compute a predicted matching feature using an initial set of model parameters. The learner module then compares the predicted matching probability and the predicted feature to the ground truth data (e.g., the manually marked feature labels) in the training data set for each data item (e.g., image) used for training. The learner module then computes an accuracy of the predictions for the initial set of model parameters. If the accuracy or level of performance does not meet a threshold or configured level, the learner module incrementally adjusts the model parameters until the model generates predictions at a desired or configured level of accuracy with respect to the manually marked labels in the training data (e.g., the ground truth data). In other words, a "trained" feature prediction model is a classifier with model parameters adjusted to make accurate predictions with respect to the training data set or ground truth data.

In step 203, the feature detector 103 processes the training data set using the trained feature prediction model to generate automatically marked feature labels for the plurality of data items (e.g., images) of the training data set. In other words, feature detector 103 can feed the training data items back into the trained feature prediction model so that the trained feature prediction model can used its trained model parameters to make predictions about what features should be marked by the model. The features of the training data items marked by the trained feature prediction model are referred to "automatically marked feature labels" to distinguish them from the "manually marked feature labels" of the training data set that are generated by human labelers. As a result of this step, the training data items that have been processed by the feature detector 103 using the trained feature prediction model will have a set of manually marked feature labels and a set of automatically marked feature labels.

As previously discussed, because manually marked feature labels are created by human labelers they are also susceptible to inconsistencies arising from human related factors such as labeling skill, random error, visual acuity, experience, etc. Therefore, in many cases, the automatically marked features are likely to be more consistent because the feature prediction model is a machine process that can more consistently apply its model prediction parameters and rules. Therefore, differences between the manually marked feature set and the automatically marked feature set may indicate a potential quality problem with one or more of the data items in the training data set can lead to a lower quality prediction model.

Figure 3B:
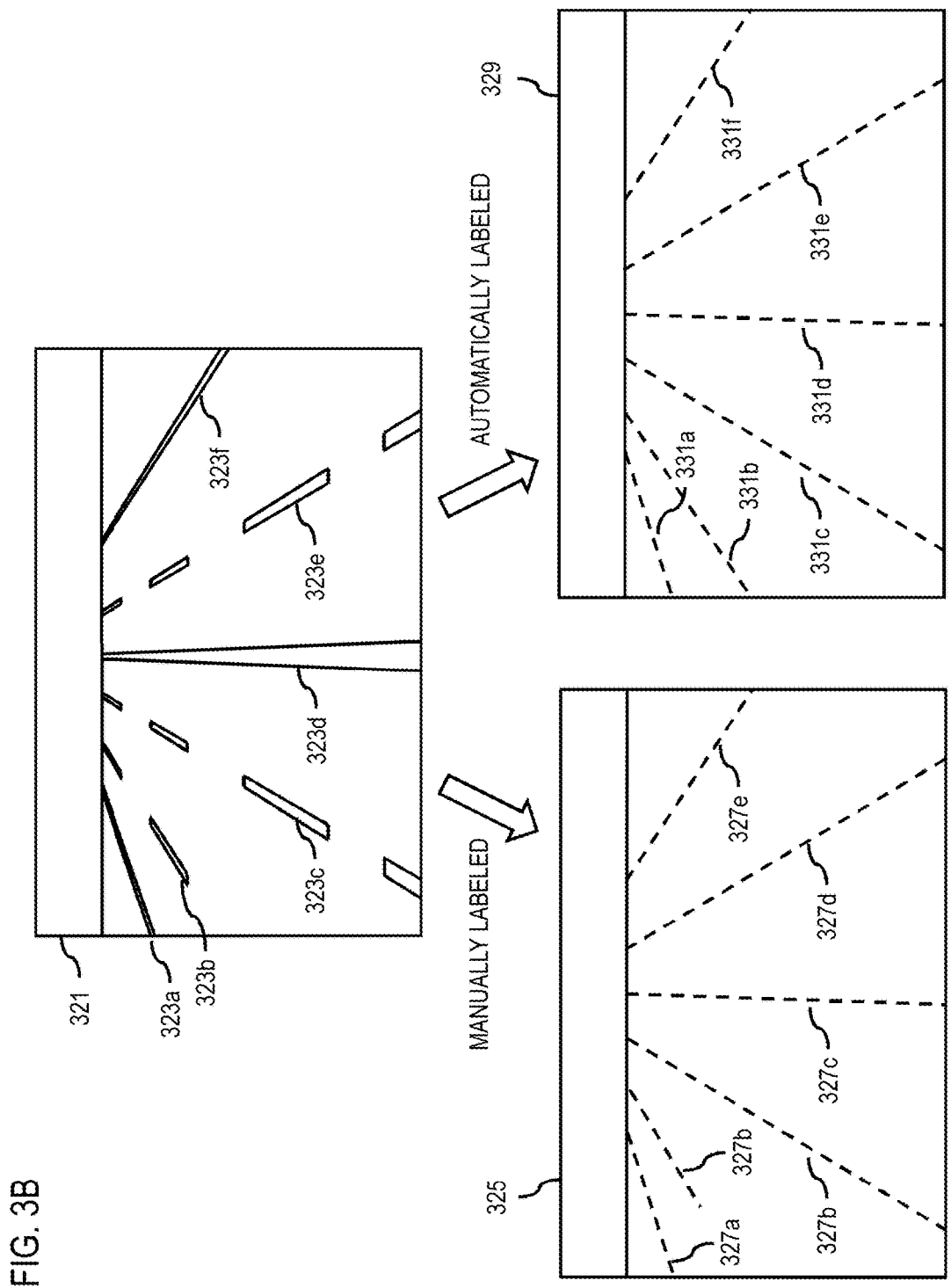

FIGS. 3A-3C are examples comparing manually marked feature labels with automatically marked feature labels, according to one embodiment. In the example of FIG. 3A, an image 301 is included in the training data set that was used to train the feature prediction model of the feature detector 103 to recognize lane lines in image data to support visual odometry in autonomous vehicles 101. As shown, the image 301 depicts six lane lines 303a-303f (also collectively referred to as line lines 303). The manually marked image 305 has been labeled with manually labeled lane features 307a-307e (also collectively referred to as manually labeled lane features 307). In this example, there are only five manually labeled lane features 307 indicating that the human labeler has missed lane line 303b. However, the feature detector 103 with the trained feature prediction model has correctly identified all six lane lines 303 as shown in automatically marked image 309 with automatically labeled lane features 311a-311f (also collectively referred to as automatically labeled lane features 311), including the lane 303b that was missed during creation of the manually marked training data set.

FIG. 3B illustrates an example similar to the example of FIG. 3A. As shown, an image 321 is also an image included in the training data set, and depicts six lane lines 323a-323f (also collectively referred to as line lines 323). In this example, the manually marked image 325 correctly identifies all six lanes 303 by including manually marked lane features 327a-327e (also collectively referred to as manually marked lane features 327). However, the manual labeler has failed to extend manually marked lane feature 327b which represents lane line 323b to the edge of the screen because of the gap appearing between the lane marking of lane line 323b. As shown in the automatically labeled image 329, the feature detector 103 has correctly labeled all six lane lines 323 as automatically marked lane features 331a-331b including extending automatically marked lane feature 331b to correctly represent lane line 323b.

FIG. 3C illustrates an example in which the training image 341 has an overexposed area 343 that obscures the visibility of portions of the depicted lane lines 345a-345e (also collectively referred to as lane lines 345). In this example, the human labeler is unable to see the lane lines 345, and therefore cannot label the portion of the lane lines extending into the overexposed area 343. As shown in the manually marked image 347, the human labeler has included six manually marked lane features 349a-349e (also collectively referred to as manually marked lane features 349 corresponding to the six lane lines 345 but has failed to label the full extent of the marked lane features 349. In contrast, the feature detector 103 is trained to predict accurate lane lines even in overexposed or otherwise obscured areas as shown in automatically marked image 351 with automatically marked lane features 353a-353f (also referred to as automatically marked lane features 353).

The examples of FIG. 3A-3C are provided by way of illustration and not as limitations. It is contemplated that differences between manually marked feature sets and automatically marked feature sets can arise for any reason and may depend on the type of phenomenon being observed, the type of data item or media format used to represent the observed phenomenon, the features between being characterized, etc.

In one embodiment, the feature detector 103 can process all data items in the training data set to generate respective automatically marked feature labels for comparison to the manually marked feature labels. Alternatively, the feature detector 103 can select a subset of the data items or images in the training data set for automatic labeling. By selecting a representative subset, the feature detector 103 can advantageously reduce the number of data items or images it needs to process, thereby reducing the computing, bandwidth, memory, etc. resources associated with evaluating training data sets according to the various embodiments.

Returning to FIG. 2, in step 205, the feature detector 103 computes precision data indicating a respective precision between the manually marked feature labels and the automatically marked feature labels for one or more of the plurality of data items (e.g., images) in the training data set. Precision, for instance, represents the degree to which the manually marked labels and the automatically marked labels differ, and can be determined according to any quality metric. In one embodiment, the quality metric can depend on the feature being classified. For example, if the feature is an object in an image that is associated with a particular location in the image (e.g., objects used for visual odometry), the respective precision can be based on a feature distance metric.

Figure 4A:
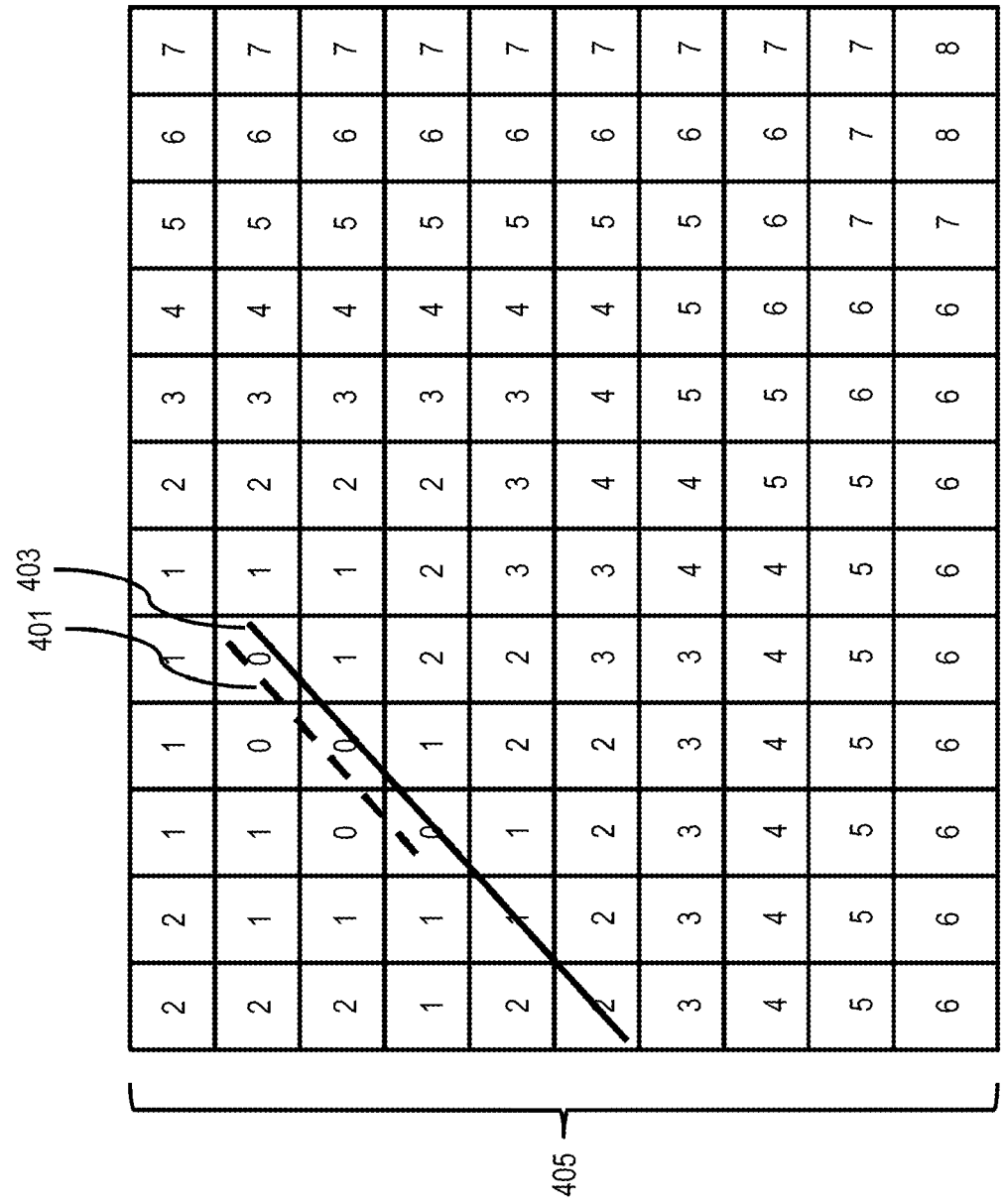
FIGS. 4A and 4B are examples of quality metrics for indication precision between manually marked feature labels and automatically marked feature labels, according to one embodiment.
Figure 4B:
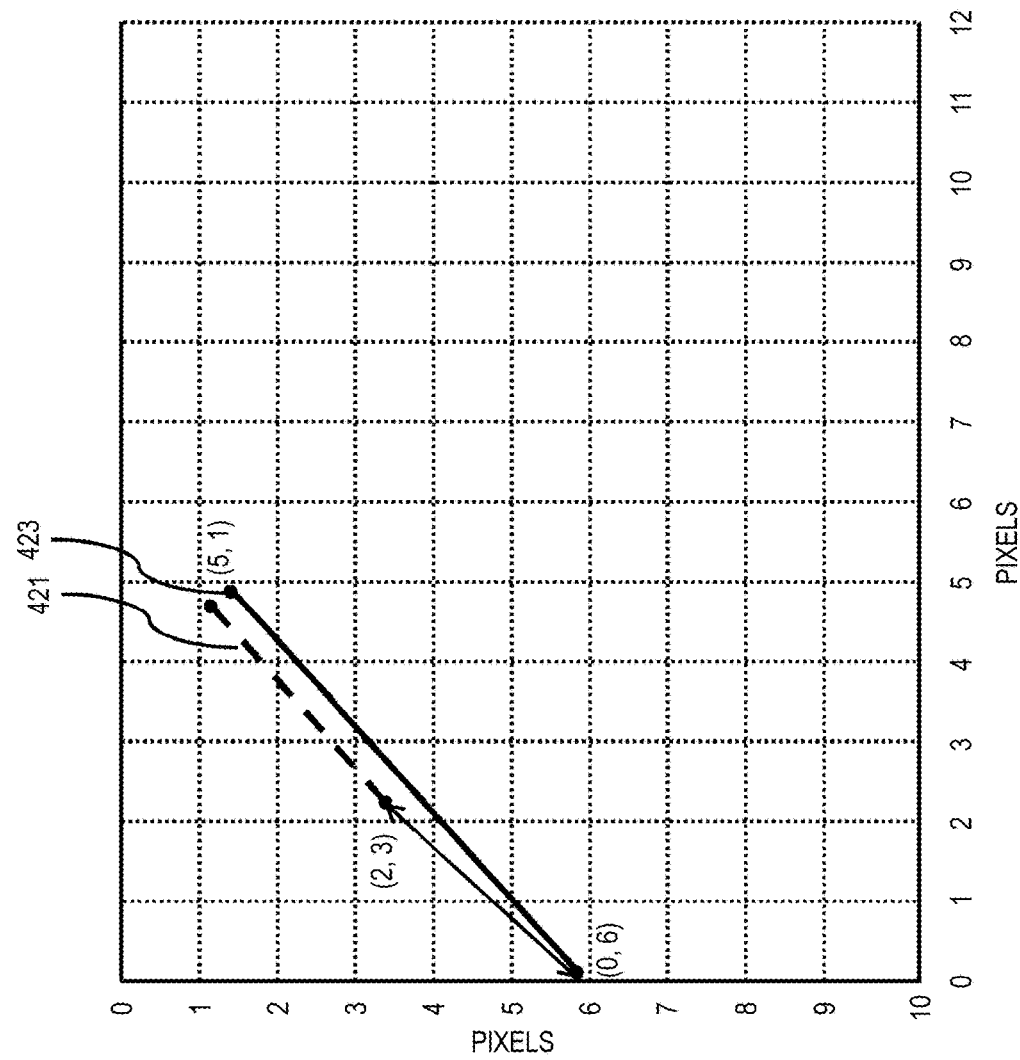

FIGS. 4A and 4B are examples of quality metrics for indication precision between manually marked feature labels and automatically marked feature labels based distance, according to one embodiment. FIG. 4A is an example determining a similarity or precision between a manually marked lane feature 401 and an automatically marked lane feature 403 representing the same lane line depicted in an image. In the example of FIG. 4A, the feature detector 103 applies a precision metric that is sensitive to the location of the edges lines and/or polygons. In one embodiment, this approach to evaluating precision is based on applying a distance transformation 405 with respect to the manually marked lane feature 401. As shown in FIG. 4A, the distance transformation 405 is based on a grid of pixels of an image from which the manually marked lane feature 401. More specifically, the distance transformation assigns a pixel distance of zero for all pixels on which the manually marked lane feature 401 lies. The value of each respective pixel is then the distance of the pixel from the manually marked lane feature 401. After assigning the pixel values based on the manually marked lane feature 401, the feature detector 103 overlays the automatically marked lane feature 403 onto the distance transformation. The precision can then be calculated as the sum of the pixel values intersecting with the automatically marked lane feature 403. It is noted that this metric is asymmetric because a comparison of the manually marked lane feature 401 to automatically marked lane feature 403 results in a different value than a comparison of the automatically marked lane feature 403 to the manually marked lane feature 401. It is contemplated that any direction of the distance transformation metric can be used according to the various embodiments described herein.

FIG. 4B is another example of a distance metric that can be used to determine precision according to the various embodiments described herein. The distance metric of FIG. 4B is based on the cumulative distance between the closest end points of the manually marked lane feature 421 and the automatically marked lane feature 423. For example, the first end point of the features 421 and 423 or coincident at pixel location (5,1) and so the distance is 0. The second end point of the manually marked lane feature 421 is at location (2,3) and the second end point of the automatically marked lane feature 423 is at pixel location (0,6). pixel The distance between the two second end points can be calculated using any distance type (e.g., Euclidean distance, Manhattan distance, chessboard distance, etc.). For example, the distance according between the second end points in Euclidean distance is 3.6.

Following the calculation of the precision data, the feature detector 103 initiates a quality assurance (QA) procedure on one or more of the plurality of data items (e.g., images) of the training data set based on a determination that the precision data does not satisfy a quality assurance criterion (step 207 of FIG. 2). For example, if the precision between the manually and automatically marked labels is greater than a threshold value that is specified as the QA criterion, then the data item or image associated with that precision can undergo one or more specified QA procedures. In one embodiment, the QA procedure can include, but is not limited to, any combination of the processes 209-215 described below.

For example, at process 209, the QA procedure includes causing the feature detector 103 to filter data items (e.g., or images) that have respective precisions that do not satisfy the quality assurance criterion from the training data set. In other words, any data item in the training data set with manually marked and automatically marked feature labels that do not agree within the tolerances specified by the QA criterion is removed from the training data set. By removing these data items from the training set automatically based on precision, the feature detector 103 advantageously improves the quality of the training set as well as the resulting trained feature prediction model without incurring the human resource requirements needed to perform manual filtering or QA. The feature detector 103 then retrains the feature prediction model using the filtered training data set to improve the quality of the model by removing potentially corrupt or inaccurate manually labeled data. It is noted that, in one embodiment, the automatically marked feature labels are used for filtering manually labeled data and are not replacements of the manually marked labels that is used for training the prediction model.

At process 211, the QA procedure includes causing the feature detector 103 to flag the one or more of the plurality of data items with the respective precision that does not satisfy the quality assurance criterion to indicate a potential need for additional quality assurance. In one embodiment, the feature detector 103 can then query for all flagged data items to create a report of potential QA issues. Additional QA can include, but is not limited to, transmitting the flagged data items to a QA system or module for presentation to QA auditors for further review. In this case, the automatic flagging acts as a first line filter to identify data items for further (e.g., manual) review and correction if needed. This advantageously reduces the amount of resources needed to operate a manual QA system or department. In one embodiment, the feature detector 103 can sort the data items by precision and then transmit the data items with the lowest precision for QA first.

At process 213, the QA procedure includes causing the feature detector 103 to process the precision data to identify characteristics of the plurality of data items that have respective precision data that does not satisfy the quality assurance criterion. The characteristics can be retrieved, for instance, from metadata or other data sources describing the data items. For example, with respect to images and similar data items, the characteristics can be stored as metadata in EXIF format, and include parameters such as a camera type, exposure, shutter speed, location, film sensitivity, etc. In other cases, the feature detector 103 can use machine learning, other predictive models, and/or equivalent means to evaluate the quality of the images directly from the image. By way of example, the one or more characteristics with respect to images include an exposure (e.g., areas of over exposure or under exposure), a focus of the plurality of images, occluded or obscured areas of the picture, or a combination thereof.

In one embodiment, the feature detector 103 can determine the characteristics (e.g., overexposed areas as shown in FIG. 3C), that commonly result in instances of precision between manually marked and automatically marked feature labels that do not meet the QA criterion. The feature detector 103 can determine respective precision averages for each type of characteristic and then rank the characteristics by their impacts on precision. Those characteristics that affect precision above a threshold value can then be used to identify data items in the training set that may require additional QA review or confirmation before using the items to train the feature prediction model.

At process 215, the QA procedure includes causing the feature detector 103 to identify a labeler that is the source of the manually marked labels for data items or images that have respective precision that does not satisfy the quality assurance criterion. In one embodiment, each data item or image in the training data set can identify a labeler (e.g., human) that created the manually marked feature labels for the item. For example, each data item or image can include a data field with a labeler ID identifying the labeler. The feature detector 103 can then determine which labeler is associate with data items or images that are manually marked with labels that do not meet their respective automatically marked labels to a specified precision level. In one embodiment, the feature detector 103 then computes a labeling performance value for one or more labelers identified in the training data set based on the precision data.

Figure 5A:
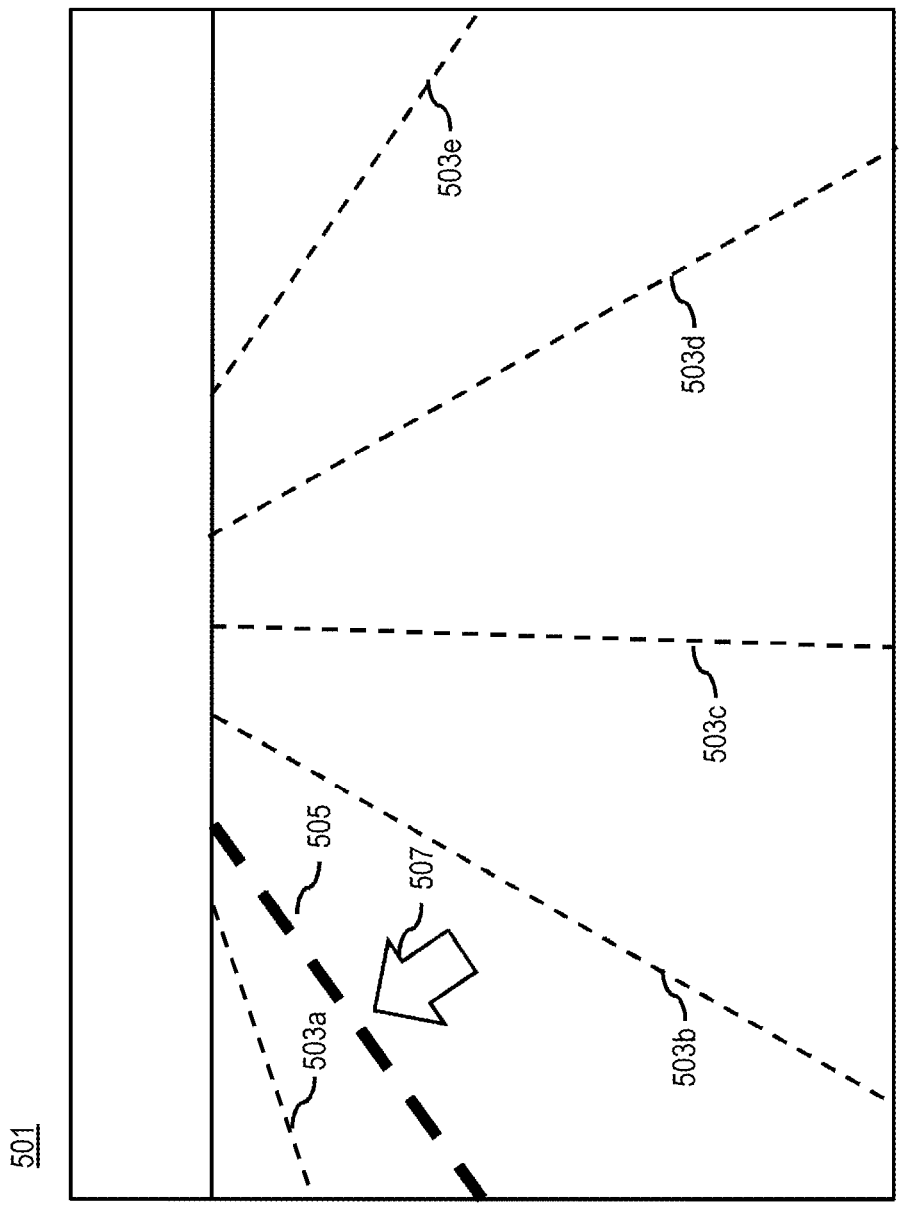
FIG. 5A is an example user interface for presenting a representation of the precision between manually marked feature labels and automatically marked feature labels, according to one embodiment.
Figure 5B:
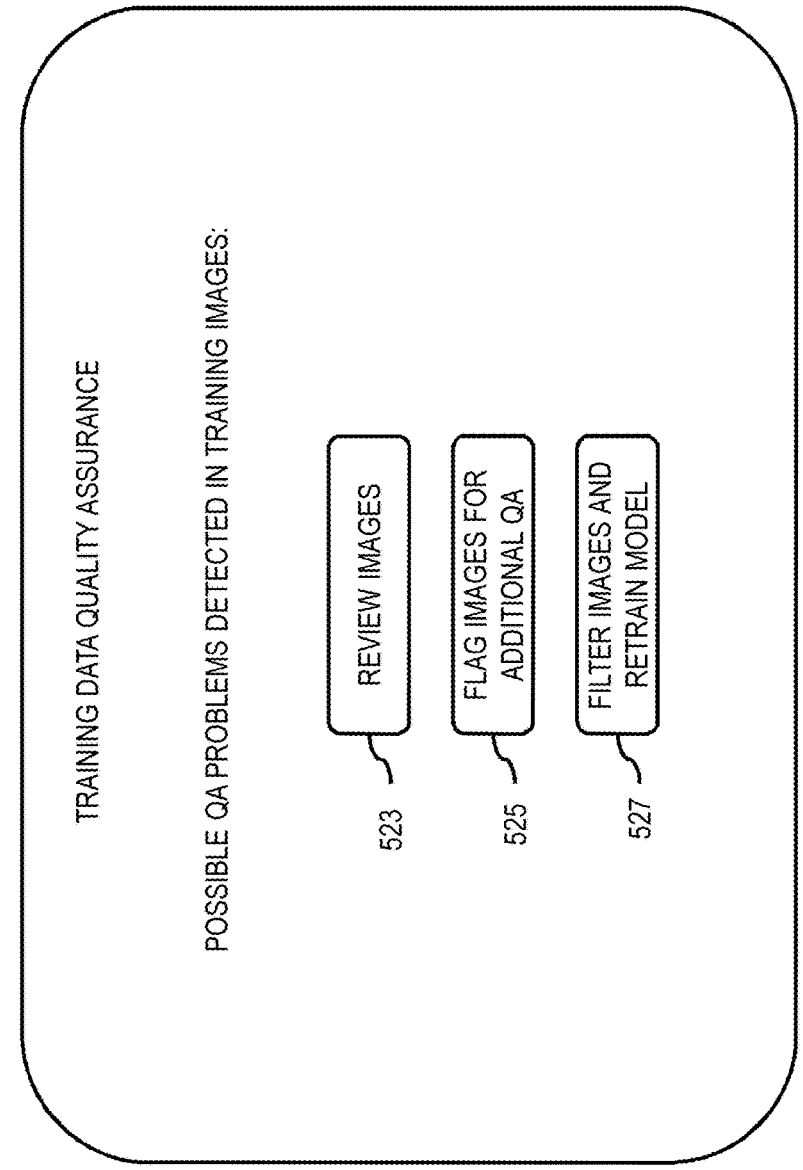
FIGS. 5B and 5C are example user interfaces for managing the quality assurance of a training data set, according to one embodiment.
Figure 5C:
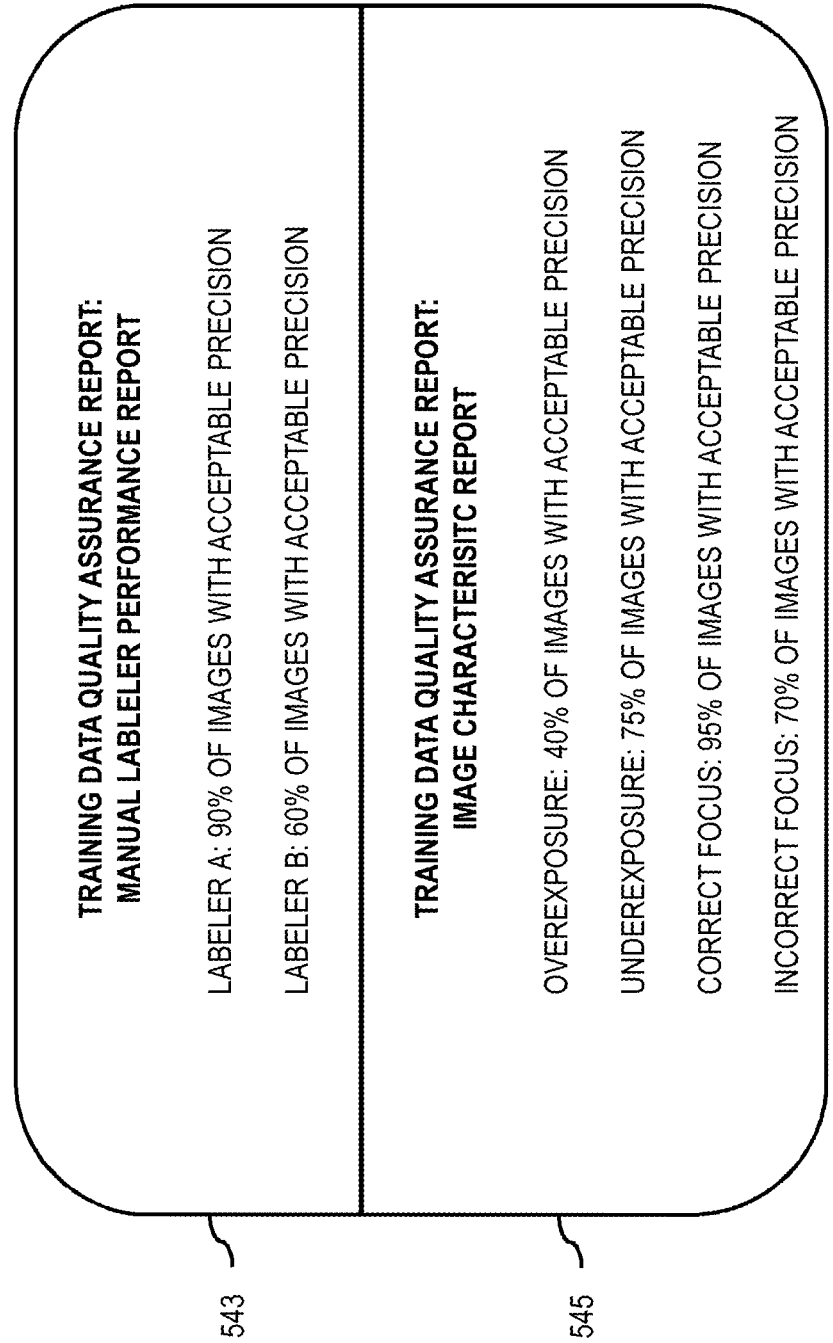

FIGS. 5A-5C are example user interfaces for presenting a representation of the precision between manually marked feature labels and automatically marked feature labels, according to one embodiment. In one embodiment, the feature detector 103 generates a quality assurance user interface that depicts a visual representation of the precision data in relation to the manually marked feature labels, the automatically marked feature labels, or a combination thereof. For example, FIG. 5A depicts a user interface (UI) 501 that displays a representation of differences between the manually marked feature labels and automatically marked feature labels of an image depicting lane lines similar to those shown in FIGS. 3A-3C. The UI 501 displays lane lines 503a-503e with manually marked and automatically marked feature labels that match with precision that meets a specified QA criterion. In this example, a lane line 505 depicted in the UI 501 has manually marked and automatically marked feature labels that do not meet the QA criterion, and thus is highlighted in the UI 501 to indicate it accordingly.

In one embodiment, the highlight is performed by rendering the lane line using a bold highlight. However, it is contemplated that the feature detector 103 can use any means to highlight or indicate that the lane line 505 has poor precision. For example, an arrow or other visual indicator can be rendered in the UI 501 alone or in combination with the bold highlight to indicate the poor precision.

FIGS. 5B and 5C are example user interfaces for managing the quality assurance of a training data set, according to one embodiment. FIG. 5B depicts a UI 521 that presents options for executing one or more QA procedures after the feature detector 103 generates precision data between manually and automatically marked features of the training data set. In this example, the feature detector 103 determines that there are "Possible QA problems detected in training images" based on determining that some of the calculated precision data failed to meet QA criteria. The UI 521 then presents an option 523 to review images or data items that failed to meet the QA criteria to enable a user to inspect the images; an option 525 to flag the images that failed to meet the QA criteria for additional QA; and an option 527 to filter the images that failed to meet the QA criteria that failed to meet the QA criteria from the training data set and to retrain the prediction model using the filtered training data set.

FIG. 5C is an example of a UI 541 for presenting QA reports based on the label precision data generated according to the various embodiments described herein. As shown, the UI 541 can present a QA report section 543 displaying the performance of Labelers A and B who generated some of the manually marked feature labels in the training data set. In this example, Labeler A is calculated to have 90% of his/her images or data items marked with acceptable precision (e.g., precision above the QA criteria), while Labeler B is calculated to have 60% of his/her images or data items marked with acceptable precision. In one embodiment, the UI 541 can also present an image characteristic report section 545 in addition to or in place of the QA report section 543. Image characteristic report section 545 presents precision data for various characteristics of images in the training data set such as overexposure (40% of overexposed images with acceptable precision), underexposure (75% of underexposed images with acceptable precision), correct focus (95% of images with correct focus with acceptable precision), and incorrect focus (70% of images incorrect focus with acceptable precision).

Returning to FIG. 1, as shown, the system 100 includes the feature detector 103 for providing quality training data to train a feature prediction model according the various embodiments described herein. In addition, the system 100 includes the computer vision system 105 configured to detect road features (e.g., lane lines, signs, etc.) in an input image and generate associated prediction confidence values, according to the various embodiments described herein. In one embodiment, the feature detector 103 and/or the feature prediction model includes a neural network or other machine learning/parallel processing system to automatically detect features in data items. For example, with the data items are images used for visual odometry, the features of interest can include lane lines in image data to support localization of, e.g., a vehicle 101 within the sensed environment. In one embodiment, the neural network of the feature detector 103 is a traditional convolutional neural network which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above.

In one embodiment, the feature detector 103 and/or the computer vision system 105 also have connectivity or access to a geographic database 111 which stores representations of mapped geographic features to facilitate visual odometry to increase localization accuracy. The geographic database 111 can also store parametric representations of lane lines and other similar features and/or related data generated or used to encode or decode parametric representations of lane lines according to the various embodiments described herein.

In one embodiment, the feature detector 103 and/or computer vision system 105 have connectivity over a communication network 113 to the services platform 107 that provides one or more services 109. By way of example, the services 109 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 109 uses the output of the feature detector 103 and/or of the computer vision system 105 (e.g., detected lane features) to localize the vehicle 101 or a user equipment 115 (e.g., a portable navigation device, smartphone, portable computer, tablet, etc.) to provide services 109 such as navigation, mapping, other location-based services, etc.

In one embodiment, the feature detector 103 and/or computer vision system 105 may be a platform with multiple interconnected components. The feature detector 103 and/or computer vision system 105 may include multiple servers, intelligent networking devices, computing devices, components and corresponding software for providing parametric representations of lane lines. In addition, it is noted that the feature detector 103 and/or computer vision system 105 may be a separate entity of the system 100, a part of the one or more services 109, a part of the services platform 107, or included within the UE 115 and/or vehicle 101.

In one embodiment, content providers 117a-117m (collectively referred to as content providers 117) may provide content or data (e.g., including geographic data, parametric representations of mapped features, etc.) to the geographic database 111, the feature detector 103, the computer vision system 105, the services platform 107, the services 109, the UE 115, the vehicle 101, and/or an application 119 executing on the UE 115. The content provided may be any type of content, such as map content, textual content, audio content, video content, image content, etc. In one embodiment, the content providers 117 may provide content that may aid in the detecting and classifying of lane lines and/or other features in image data, and estimating the quality of the detected features. In one embodiment, the content providers 117 may also store content associated with the geographic database 111, feature detector 103, computer vision system 105, services platform 107, services 109, UE 115, and/or vehicle 101. In another embodiment, the content providers 117 may manage access to a central repository of data, and offer a consistent, standard interface to data, such as a repository of the geographic database 111.

In one embodiment, the UE 115 and/or vehicle 101 may execute a software application 119 to collect, encode, and/or decode feature data detected in image data to train feature prediction models according the embodiments described herein. By way of example, the application 119 may also be any type of application that is executable on the UE 115 and/or vehicle 101, such as autonomous driving applications, mapping applications, location-based service applications, navigation applications, content provisioning services, camera/imaging application, media player applications, social networking applications, calendar applications, and the like. In one embodiment, the application 119 may act as a client for the feature detector 103 and/or computer vision system 105 and perform one or more functions associated with training feature prediction models alone or in combination with the feature detector 103.

By way of example, the UE 115 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 115 can support any type of interface to the user (such as "wearable" circuitry, etc.). In one embodiment, the UE 115 may be associated with the vehicle 101 or be a component part of the vehicle 101.

In one embodiment, the UE 115 and/or vehicle 101 are configured with various sensors for generating or collecting environmental image data (e.g., for processing by the feature detector 103 and/or computer vision system 105), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 115 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 115 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 115 and/or vehicle 101 may include GPS or other satellite-based receivers to obtain geographic coordinates from satellites 121 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the feature detector 103, computer vision system 105, services platform 107, services 109, UE 115, vehicle 101, and/or content providers 117 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
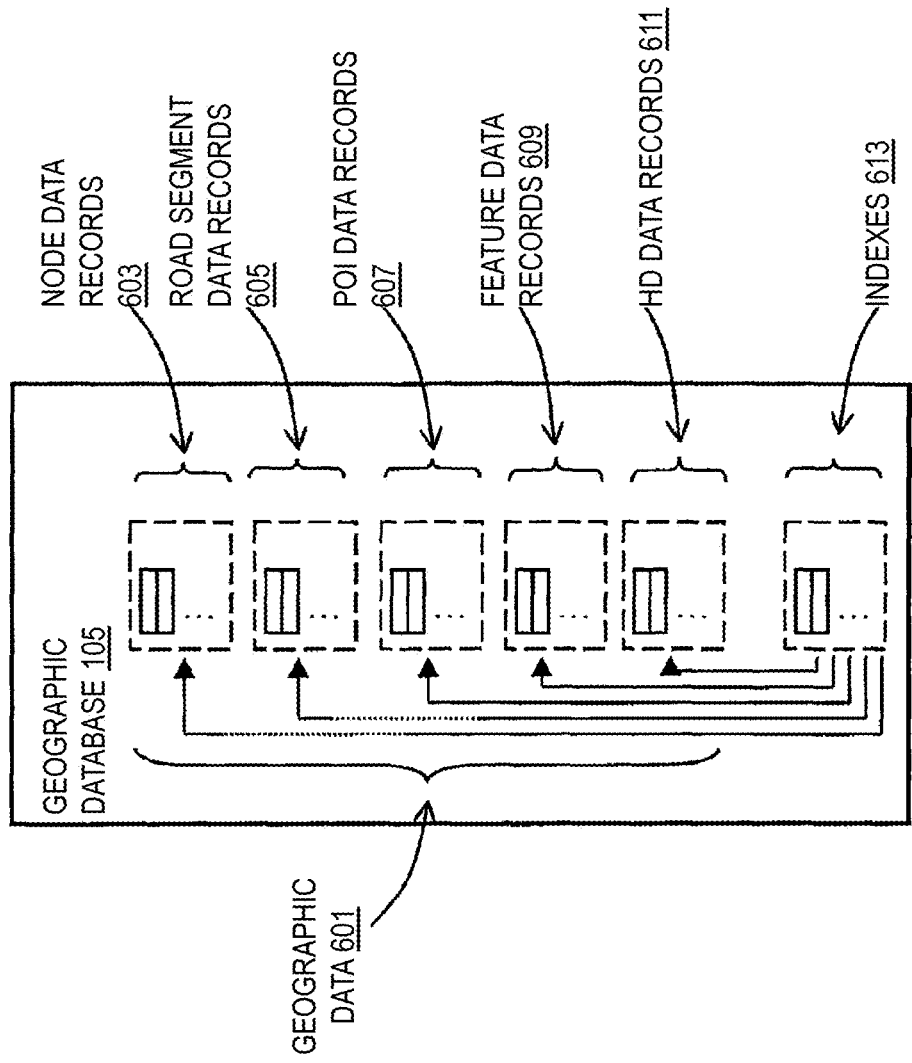
FIG. 6 is a diagram of a geographic database, according to one embodiment.

FIG. 6 is a diagram of a geographic database, according to one embodiment. In one embodiment, the geographic database 111 includes geographic data 601 used for (or configured to be compiled to be used for) mapping and/or navigation-related services, such as for video odometry based on the parametric representation of lanes include, e.g., encoding and/or decoding parametric representations into lane lines. In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., HD data records 611) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 603, road segment or link data records 605, POI data records 607, feature data records 609, HD mapping data records 611, and indexes 613, for example. More, fewer or different data records can be provided. In one embodiment, additional data records (not shown) can include cartographic ("carto") data records, routing data, and maneuver data. In one embodiment, the indexes 613 may improve the speed of data retrieval operations in the geographic database 111. In one embodiment, the indexes 613 may be used to quickly locate data without having to search every row in the geographic database 111 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points corresponding to the respective links or segments of the road segment data records 605. The road link data records 605 and the node data records 603 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 607. The geographic database 111 can also include data about places, such as cities, towns, or other communities, and other geographic features, such as bodies of water, mountain ranges, etc. Such place or feature data can be part of the POI data records 307 or can be associated with POIs or POI data records 607 (such as a data point used for displaying or representing a position of a city).

In one embodiment, the geographic database 111 can also include feature data records 609 for storing training data, prediction models, manually marked feature labels, automatically marked feature labels, precision criteria, labeler performance records, QA reports such as identified data item characteristics associated with poor precision, and/or any other data generated or used by the system 100 according to the various embodiments described herein. In one embodiment, the geographic database 111 can also store the confidence values of predicted features. By way of example, the feature data records 609 can be associated with one or more of the node records 603, road segment records 605, and/or POI data records 607 to support localization or visual odometry based on the features stored therein and the corresponding estimated quality of the features. In this way, the records 609 can also be associated with the characteristics or metadata of the corresponding records 603, 605, and/or 607.

In one embodiment, as discussed above, the HD mapping data records 611 model road surfaces and other map features to centimeter-level or better accuracy. The HD mapping data records 611 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 611 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 611.

In one embodiment, the HD mapping data records 611 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 117 in association with the services platform 107 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 115) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for training feature prediction models may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
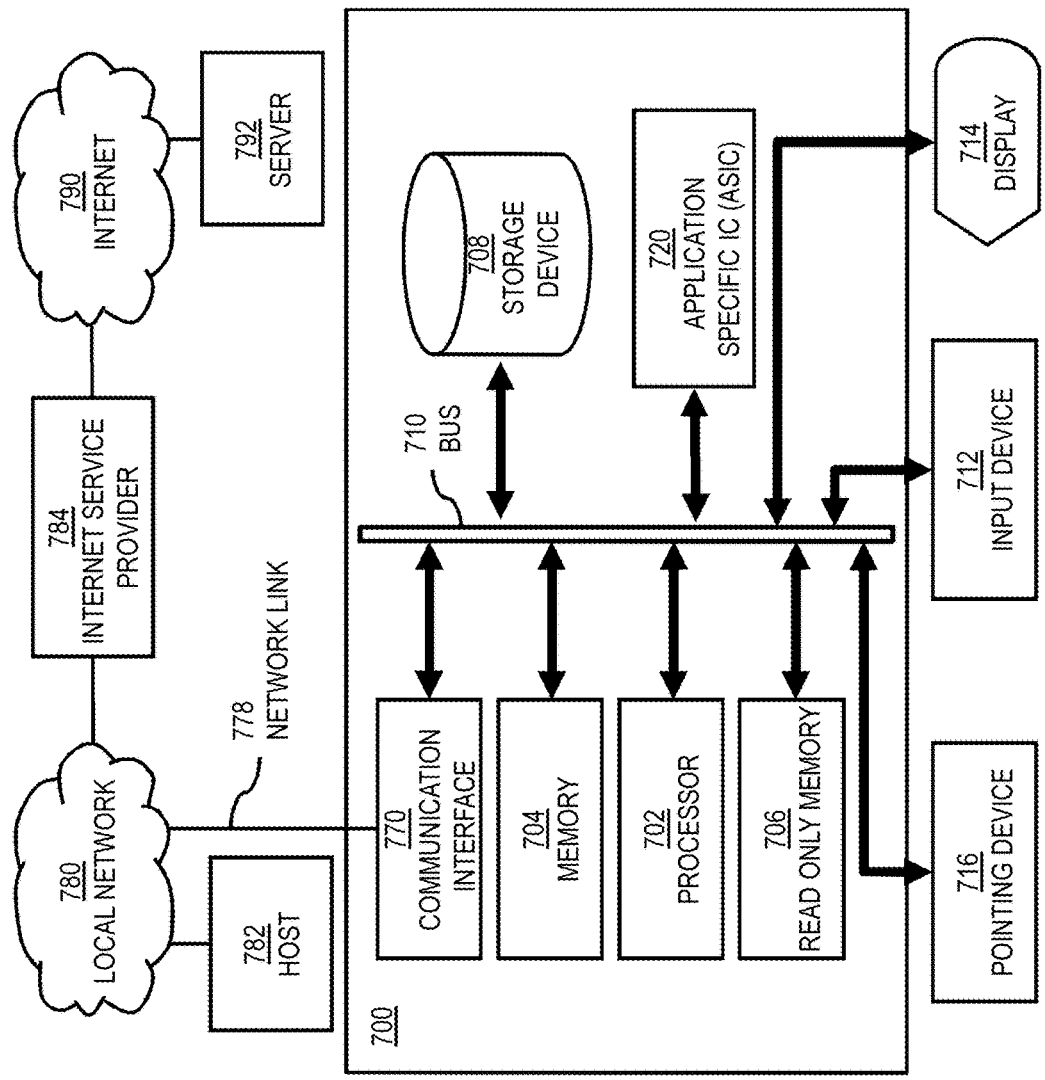
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to train feature prediction models as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to training feature prediction models. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for training feature prediction models. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for training feature prediction models, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 113 for training feature prediction models.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to train feature prediction models as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to train feature prediction models. The memory 805 also stores the data associated with or generated by the execution of the inventive steps.

Figure 9:
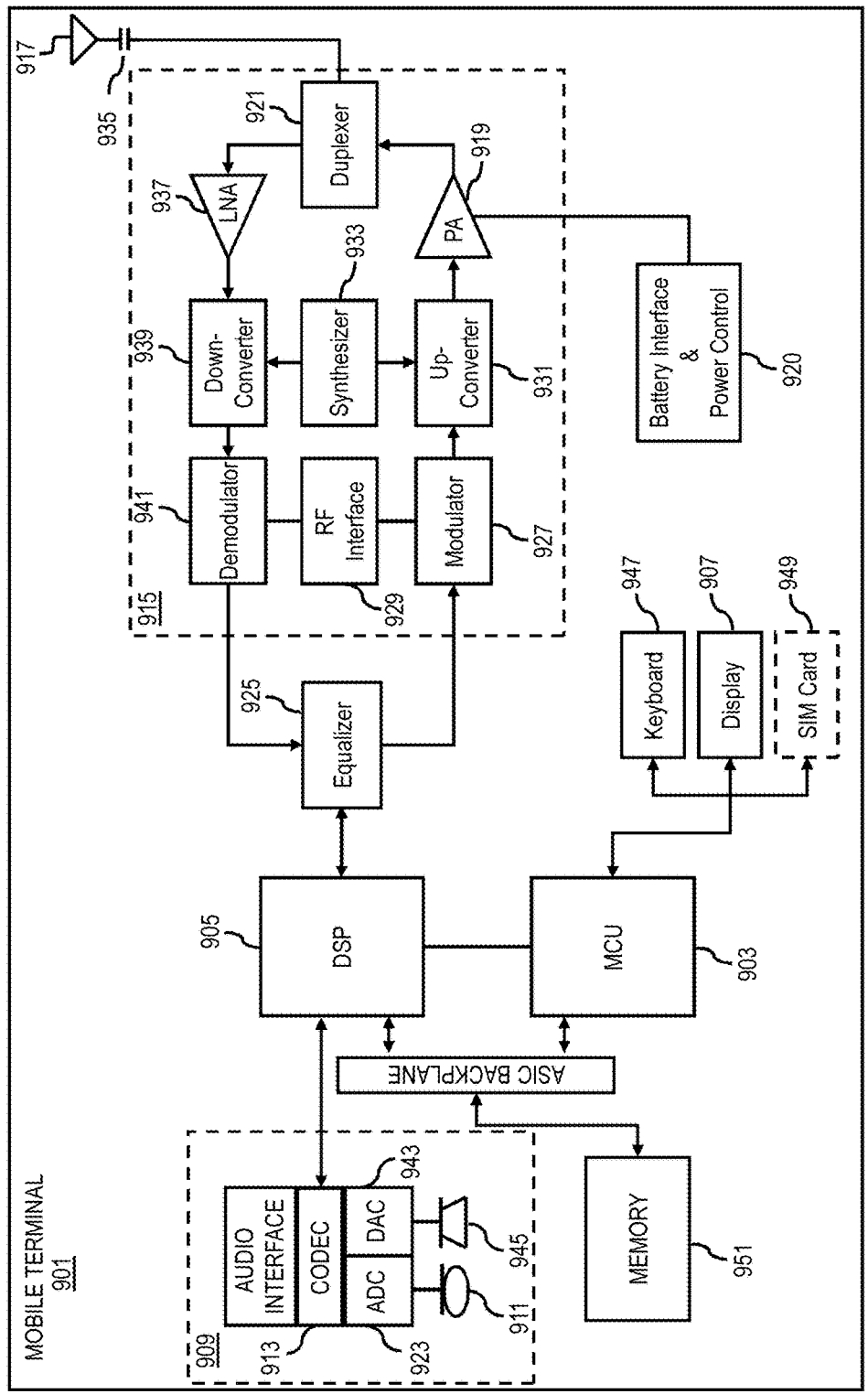
FIG. 9 is a diagram of a mobile terminal (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to train feature prediction models. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals.

Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for providing quality assurance for training a prediction model to label one or more features detected in image data comprising:
    training, by a processor, the feature prediction model to label the one or more features by using a training data set comprising a plurality of images with manually marked feature labels;
    processing the training data set using the trained feature prediction model to generate automatically marked feature labels for the plurality of images of the training data set;
    computing precision data indicating a respective precision between the manually marked feature labels and the automatically marked feature labels for each of the plurality of images in the training data set; and
    initiating a quality assurance procedure on one or more of the plurality of images of the training data set based on a determination that the precision data does not satisfy a quality assurance criterion, wherein the quality assurance procedure includes identifying a labeler that is the source of the manually marked labels for said each of the plurality of images.

2. The method of claim 1, wherein the quality assurance procedure comprises:
    filtering the one or more of the plurality of images that are associated with the respective precision that does not satisfy the quality assurance criterion from the training data set; and
    retraining the feature prediction model using the filtered training data set.

3. The method of claim 1, wherein the quality assurance procedure comprises:
    flagging the one or more of the plurality of images with the respective precision that does not satisfy the quality assurance criterion to indicate a potential need for additional quality assurance.

4. The method of claim 1, wherein the quality assurance procedure comprises:
    processing the precision data to identify one or more characteristics of the plurality of images that are associated with the respective precision that does not satisfy the quality assurance criterion.

5. The method of claim 4, wherein the one or more characteristics include an exposure of the plurality of images, a focus of the plurality of images, or a combination thereof.

6. The method of claim 1, wherein the quality assurance procedure comprises:
    computing a labeling performance value for the labeler based on the precision data.

7. The method of claim 1, wherein the respective precision is based at least in part on a feature distance metric.

8. The method of claim 1, further comprising:
    generating a quality assurance user interface that depicts a visual representation of the precision data in relation to the manually marked feature labels, the automatically marked feature labels, or a combination thereof.

9. The method of claim 1, wherein the one or more features include one or more road markings, one or more road objects, or a combination thereof, the method further comprising:
    using the trained feature prediction model to generate navigation guidance information; and
    initiating a presentation of the navigation guidance information based on the precision data.

10. An apparatus for providing quality assurance for training a feature prediction model comprising:
    at least one processor; and
    at least one memory including computer program code for one or more programs,
    the at least one memory and the computer program code configured to, with the at least one processor, cause the apparatus to perform at least the following,
        train the feature prediction model to label one or more features by using a training data set comprising a plurality of data items with manually marked feature labels;
        process the training data set using the trained feature prediction model to generate automatically marked feature labels for the plurality of data items;
        compute precision data indicating a respective precision between the manually marked feature labels and the automatically marked feature labels for each of the plurality of data items in the training data set; and
        initiate a quality assurance procedure on said each of the plurality of data items based on a determination that the precision data does not satisfy a quality assurance criterion, wherein the quality assurance procedure includes identifying a labeler that is the source of the manually marked labels for said each of the plurality of images.

11. The apparatus of claim 10, wherein the quality assurance procedure further causes the apparatus to:
    filter said each of the plurality of data items with the respective precision that does not satisfy the quality assurance criterion from the training data set; and
    retrain the feature prediction model using the filtered training data set.

12. The apparatus of claim 10, wherein the quality assurance procedure further causes the apparatus to:
flag said each of the plurality of images with the respective precision that does not satisfy the quality assurance criterion to indicate a potential need for additional quality assurance.

13. The apparatus of claim 10, wherein the quality assurance procedure further causes the apparatus to:
process the precision data to identify one or more characteristics of the plurality of images that are associated with the respective precision that does not satisfy the quality assurance criterion.

14. The apparatus of claim 10, wherein the quality assurance procedure further causes the apparatus to:
compute a labeling performance value for the labeler based on the precision data.

15. The apparatus of claim 10, wherein the quality assurance procedure further causes the apparatus to:
generate a quality assurance user interface that depicts a visual representation of the precision data in relation to the manually marked feature labels, the automatically marked feature labels, or a combination thereof.

16. A non-transitory computer-readable storage medium for providing quality assurance for training a prediction model to label one or more features detected in image data, carrying one or more sequences of one or more instructions which, when executed by one or more processors, cause an apparatus to perform:
training, by a processor, the feature prediction model to label the one or more features by using a training data set comprising a plurality of images with manually marked feature labels;
processing the training data set using the trained feature prediction model to generate automatically marked feature labels for the plurality of images of the training data set;
computing precision data indicating a respective precision between the manually marked feature labels and the automatically marked feature labels for each of the plurality of images in the training data set; and
initiating a quality assurance procedure on said each of the plurality of images based on a determination that the precision data does not satisfy a quality assurance criterion, wherein the quality assurance procedure includes identifying a labeler that is the source of the manually marked labels for said each of the plurality of images.

17. The non-transitory computer-readable storage medium of claim 16, wherein the quality assurance procedure further causes the apparatus to perform:
filtering said each of the plurality of data items with the respective precision that does not satisfy the quality assurance criterion from the training data set; and
retraining the feature prediction model using the filtered training data set.

18. The non-transitory computer-readable storage medium of claim 16, wherein the quality assurance procedure further causes the apparatus to perform:
flagging said each of the plurality of images with the respective precision that does not satisfy the quality assurance criterion to indicate a potential need for additional quality assurance.

19. The non-transitory computer-readable storage medium of claim 16, wherein the quality assurance procedure further causes the apparatus to perform:
processing the precision data to identify one or more characteristics of the plurality of images that are associated with the respective precision that does not satisfy the quality assurance criterion.

20. The non-transitory computer-readable storage medium of claim 16, wherein the quality assurance procedure further causes the apparatus to perform:
computing a labeling performance value for the labeler based on the precision data.

* * * * *